US009658787B2

(12) United States Patent
Hung et al.

(10) Patent No.: US 9,658,787 B2
(45) Date of Patent: May 23, 2017

(54) NONVOLATILE MEMORY DATA PROTECTION USING NONVOLATILE PROTECTION CODES AND VOLATILE MASK CODES

(71) Applicant: MACRONIX INTERNATIONAL CO., LTD., Hsinchu (TW)

(72) Inventors: Chun-Hsiung Hung, Hsinchu (TW); Kuen-Long Chang, Taipei (TW); Ken-Hui Chen, Hsinchu (TW); Su-Chueh Lo, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 358 days.

(21) Appl. No.: 14/310,450

(22) Filed: Jun. 20, 2014

(65) Prior Publication Data
US 2015/0242140 A1 Aug. 27, 2015

Related U.S. Application Data

(60) Provisional application No. 61/945,112, filed on Feb. 26, 2014.

(51) Int. Cl.
*G06F 12/00* (2006.01)
*G06F 3/06* (2006.01)
*G06F 12/14* (2006.01)

(52) U.S. Cl.
CPC ............ *G06F 3/0622* (2013.01); *G06F 3/062* (2013.01); *G06F 3/064* (2013.01); *G06F 3/0652* (2013.01);
(Continued)

(58) Field of Classification Search
CPC ........ G06F 12/1416–12/1491; G06F 12/0246; G06F 3/0622
(Continued)

(56) References Cited

U.S. PATENT DOCUMENTS 4,959,860 A 9/1990 Watters et al.
5,065,364 A 11/1991 Atwood et al.
(Continued)

FOREIGN PATENT DOCUMENTS

WO 9959288 A1 11/1999

OTHER PUBLICATIONS

Macronix International Co., Ltd. MX25L12873F Datasheet, Rev. 1.0, Mar. 22, 2013, 99 pages.
(Continued)

*Primary Examiner* — Prasith Thammavong
(74) *Attorney, Agent, or Firm* — Haynes Beffel & Wolfeld LLP

(57) ABSTRACT

Methods for protecting data on an integrated circuit including a memory are described. One method includes storing protection codes on the integrated circuit. Each protection code has a first value indicating a protected state and a second value indicating an unprotected state for a corresponding sector in a plurality of sectors of the memory. The method includes storing protection mask codes on the integrated circuit. Each mask code has a first value indicating a masked state or a second value indicating an unmasked state for a corresponding sector in the plurality of sectors. The method includes blocking modification in a particular sector of the memory using circuitry on the integrated circuit when the protection code for the particular sector has the first value and the mask code for the particular sector has the second value, else allowing modification in the particular sector.

34 Claims, 13 Drawing Sheets

(52) U.S. Cl.
CPC .......... *G06F 3/0659* (2013.01); *G06F 3/0688* (2013.01); *G06F 12/1416* (2013.01)

(58) Field of Classification Search
USPC ........................................................ 711/103
See application file for complete search history.

(56) References Cited

U.S. PATENT DOCUMENTS

| | | | |
|---|---|---|---|
| 5,126,808 A | 6/1992 | Montalvo et al. | |
| 5,197,034 A | 3/1993 | Fandrich et al. | |
| 5,210,845 A | 5/1993 | Crawford et al. | |
| 5,297,148 A | 3/1994 | Harari et al. | |
| 5,369,754 A | 11/1994 | Fandrich et al. | |
| 5,438,546 A | 8/1995 | Ishac et al. | |
| 5,442,704 A | 8/1995 | Holtey | |
| 5,509,134 A | 4/1996 | Fandrich et al. | |
| 5,513,136 A | 4/1996 | Fandrich et al. | |
| 5,592,641 A | 1/1997 | Fandrich et al. | |
| 5,794,033 A | 8/1998 | Aldebert et al. | |
| 5,930,826 A | 7/1999 | Lee et al. | |
| 6,026,016 A | 2/2000 | Gafken | |
| 6,073,243 A | 6/2000 | Dalvi et al. | |
| 6,209,069 B1 | 3/2001 | Baltar | |
| 6,598,135 B1 * | 7/2003 | MacLeod | G11B 7/00745 369/275.2 |
| 6,615,404 B1 * | 9/2003 | Garfunkel | G06F 8/665 717/173 |
| 6,731,536 B1 | 5/2004 | McClain et al. | |
| 2002/0101763 A1 | 8/2002 | Hosogane et al. | |
| 2003/0126513 A1 | 7/2003 | Wuidart | |
| 2004/0205314 A1 * | 10/2004 | Babudri | G06F 12/1425 711/163 |

OTHER PUBLICATIONS

Macronix International Co., Ltd. MX29GL128G Datasheet, Rev. 0.01, Mar. 21, 2013, 73 pages.

Intel Advanced+ Boot Block Flash Memory (C3) 28F800C3, 28F160C3, 28F320C3, 28F640C3 (×16) Datasheet, May 2004, 70 pages.

* cited by examiner

NONVOLATILE MEMORY DATA PROTECTION USING NONVOLATILE PROTECTION CODES AND VOLATILE MASK CODES

RELATED APPLICATIONS

This application claims benefit of U.S. Provisional Patent Application No. 61/945,112 filed on 26 Feb. 2014, which application is incorporated by reference as if fully set forth herein.

BACKGROUND OF THE INVENTION

Technical Field

This disclosure relates to memory devices and to protection of blocks of memory from modification.

Description of Related Art

A nonvolatile memory device such as a flash memory device can maintain stored data when not powered. Data stored in a nonvolatile memory device including an array of nonvolatile memory cells can be accessed or modified by performing read, erase, or program operations on the nonvolatile memory cells. Accidental or unauthorized changes to data stored in the device can be prevented by storing data in protected regions or sectors of the nonvolatile memory cell array. A group of nonvolatile memory cells in the device can be used to store protection bits for these sectors. Each bit indicates a protection state (e.g., protected or unprotected) for a corresponding protected sector. Software often need to switch frequently between protect/unprotect state in order to have good protection along with ease of access. However, changing the state of the nonvolatile protection bits require program/erase operations. So the protection bits only can be able to programmed/erased a limited number of times due to nonvolatile memory endurance limit. Moreover, program/erase operation of non-volatile memory requires much more operating time compared to volatile memory write operation.

It is therefore desirable to provide flexible and reliable data protection methods for storing data in a nonvolatile memory device.

SUMMARY

The present technology provides methods for protecting data on an integrated circuit including a memory. One method includes storing protection codes on the integrated circuit. Each protection code has a first value indicating a protected state and a second value indicating an unprotected state for a corresponding sector in a plurality of sectors of the memory. The method includes storing protection mask codes on the integrated circuit. Each mask code has a first value indicating a masked state or a second value indicating an unmasked state for a corresponding sector in the plurality of sectors. The method includes blocking modification in a particular sector of the memory using circuitry on the integrated circuit when the protection code for the particular sector has the first value and the mask code for the particular sector has the second value, else allowing modification in the particular sector.

Other aspects and advantages of the present technology can be seen on review of the drawings, the detailed description and the claims, which follow.

DETAILED DESCRIPTION

A detailed description of embodiments of the present technology is provided with reference to the Figures.

Figure 1:
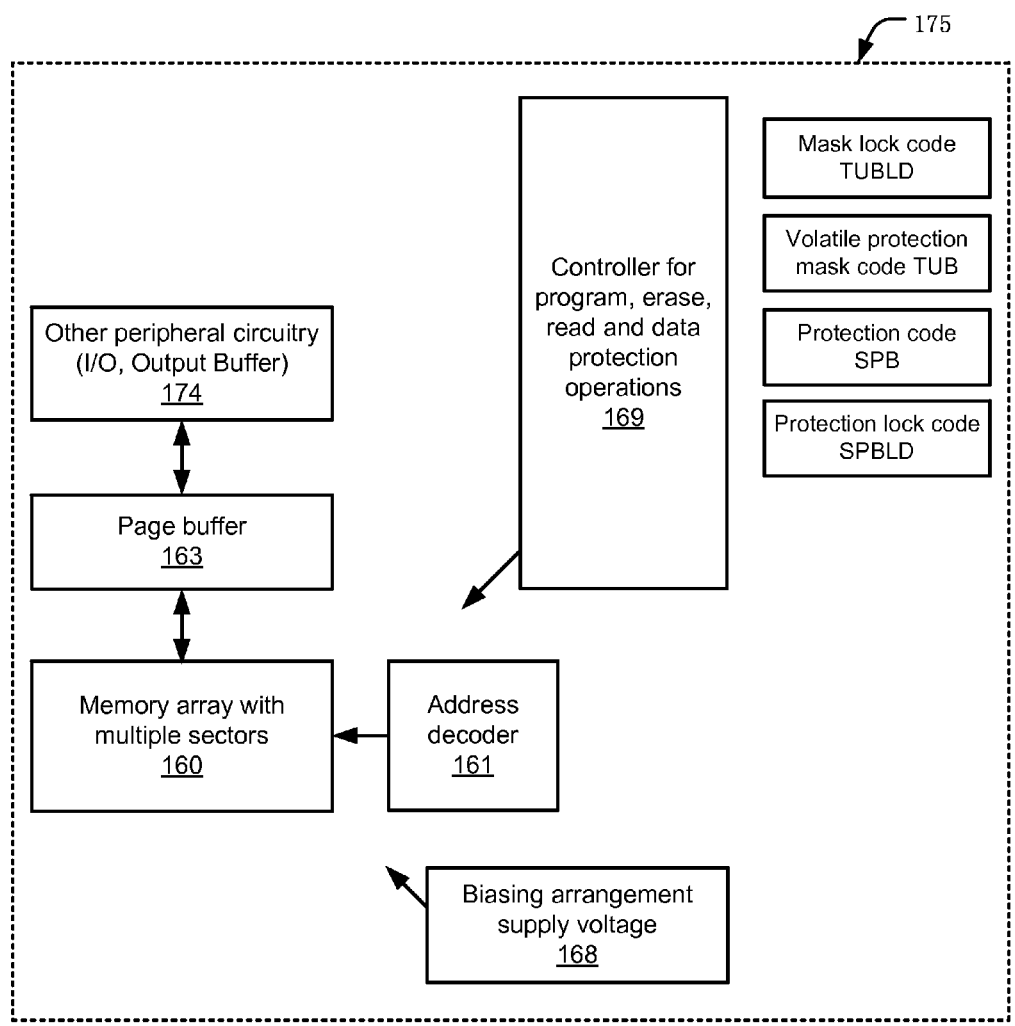
FIG. 1 is a simplified block diagram of an integrated circuit including a memory.

FIG. 1 is a simplified block diagram of an integrated circuit 175 including a memory. In this example, the integrated circuit 175 includes a memory array 160 with a plurality of sectors of memory cells. Each sector is a region of the memory array 160. The location and extent of each sector can be logically defined and need not correspond to physical segmentation of the array 160. The sectors can have uniform or different sizes across the array 160. A sector can have its access controlled by one or more protection codes as described herein.

The memory cells in the array 160 can include nonvolatile memory cells based on flash memory, phase change memory, magnetoresistive random-access-memory (MRAM), electrically erasable programmable read only memory (EEPROM), or other suitable nonvolatile memory technologies.

An address decoder 161 is coupled to the array 160. Addresses are supplied to the integrated circuit 175 and provided to the address decoder 161. The address decoder 161 can include word line decoders, bit line decoders, and other suitable decoders that decode the supplied addresses and select corresponding memory cells in the array 160.

Bit lines in the array 160 are coupled to a page buffer 163, which in turn is coupled to other peripheral circuitry 174. The page buffer 163 can include one or more storage elements (e.g., latches) for each bit line connected. The address decoder 161 can select and couple specific memory cells in the array 160 via respective connecting bit lines to the page buffer 163. The page buffer 163 can then store data that is written to or read from these specific memory cells.

Peripheral circuitry includes circuits that are formed using logic circuits or analog circuits that are not part of the array 160, such as the address decoder 161, the controller 169, biasing arrangement supply voltage block 168, and so on. In this example, the block 174 labeled other peripheral circuitry can include input-output (I/O) circuits, output data buffers, and other circuit components on the integrated circuit 175, such as a general purpose processor or special-purpose application circuitry, or a combination of modules providing system-on-a-chip functionality supported by the array 160.

The controller 169, implemented for example as a state machine, provides signals to control other circuits of the integrated circuit 175 to carry out the various operations described herein. These operations include program operations, erase operations, read operations, and data protection operations.

The controller 169 can be implemented using special-purpose logic circuitry as known in the art. In other embodiments, the controller comprises a general purpose processor, which may be implemented on the same integrated circuit 175, which executes a computer program to control the operations of the device. In yet other embodiments, a combination of special purpose logic circuitry and a general purpose processor may be utilized for implementation of the controller.

The integrated circuit 175 includes memory elements storing data protection codes for one or more sectors of the memory array 160. In the example of FIG. 1, various memory elements in the integrated circuit 175 store protection code SPB ("Nonvolatile Solid Write Protect Bits"), protection lock code SPBLD ("SPB Lockdown Bit"), volatile protection mask code TUB ("Volatile Temporary Unprotect Bits"), and mask lock code TUBLD ("TUB Lockdown Bits") for one or more sectors of the memory array 160, as described in more detail below.

Figure 2:
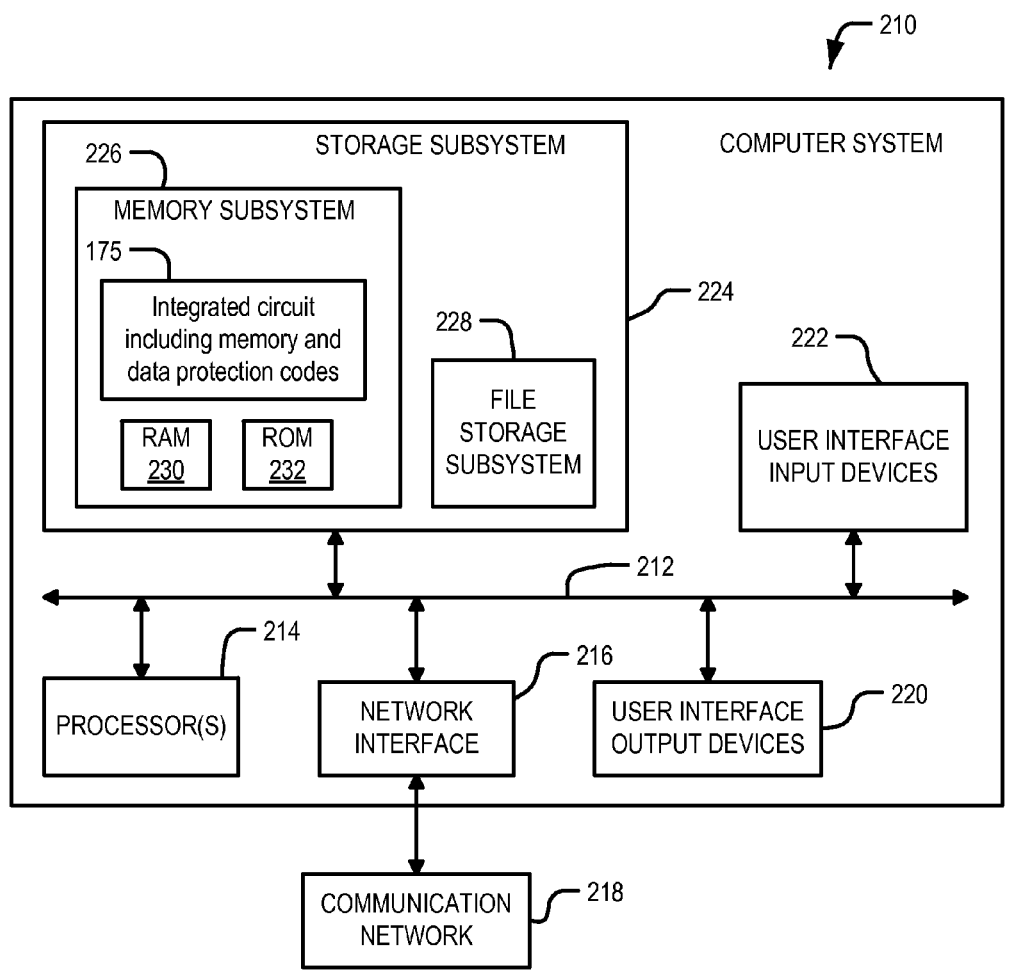
FIG. 2 is a simplified block diagram of a computer system incorporating an integrated circuit including a memory.

FIG. 2 is a simplified block diagram of a computer system 210 incorporating the integrated circuit 175 illustrated in FIG. 1. Computer system 210 typically includes at least one processor 214 which communicates with a number of peripheral devices via bus subsystem 212. These peripheral devices may include a storage subsystem 224, comprising a memory subsystem 226 and a file storage subsystem 228, user interface input devices 222, user interface output devices 220, and a network interface subsystem 216. The input and output devices allow user interaction with computer system 210. Network interface subsystem 216 provides an interface to outside networks, including an interface to communication network 218, and is coupled via communication network 218 to corresponding interface devices in other computer systems. Communication network 218 may comprise many interconnected computer systems and communication links. These communication links may be wireline links, optical links, wireless links, or any other mechanisms for communication of information. While in one embodiment the communication network 218 is the Internet, communication network 218 may be any suitable computer network.

User interface input devices 222 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 210 or onto communication network 218.

User interface output devices 220 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 210 to the user or to another machine or computer system.

Storage subsystem 224 stores programming and data construct, and software modules that provide the functionality of the computer system 210. These software modules are generally executed by processor 214.

Memory subsystem 226 typically includes a number of memories including a main random access memory (RAM) 230 for storage of instructions and data during program execution by processor 214, and a read only memory (ROM) 232 in which fixed instructions are stored. Memory subsystem 226 also includes the integrated circuit 175 described with reference to FIG. 1. The integrated circuit 175 provides storage for program codes and data files for the computer system 210.

File storage subsystem 228 provides storage for program and data files for the computer system 210, and may include a hard disk drive, a floppy disk drive along with associated removable media, a CD-ROM drive, an optical drive, or removable media cartridges.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Computer system 210 can be of varying types including a personal computer, a portable computer, a workstation, a computer terminal, a network computer, a television, a smartphone, a mainframe, or any other data processing system or user device. Due to the ever-changing nature of computers and networks, the description of computer system 210 depicted in FIG. 2 is intended only as a specific example for purposes of illustrating the preferred embodiments. Many other configurations of computer system 210 are possible having more or less components than the computer system depicted in FIG. 2.

The computer system 210 (or a user of the computer system 210) can access or change data (program codes or data files) stored in the integrated circuit 175. For example, during execution of a software program, the processor 214 may send a command (e.g., including an instruction code, an address, and a block size) to the integrated circuit 175 to free up or erase a block of memory cells in the memory array 160 of the integrated circuit 175. In response to the command, the controller 169 of the integrated circuit 175 performs an erase operation by selecting (e.g., by the address decoder 161) memory cells corresponding to the address and block size, and supplying erase voltage pulses (e.g., by the biasing arrangement supply voltage 168) to the selected memory cells. However, problems can arise if data erased from the selected memory cells is intended for another use (e.g., program codes or data files for another software program). To prevent such accidental or unauthorized changes to data stored in the memory array of the integrated circuit 175, methods for memory data protection are provided by using data protection codes stored in the integrated circuit 175, as described in more detail below.

Figure 3:
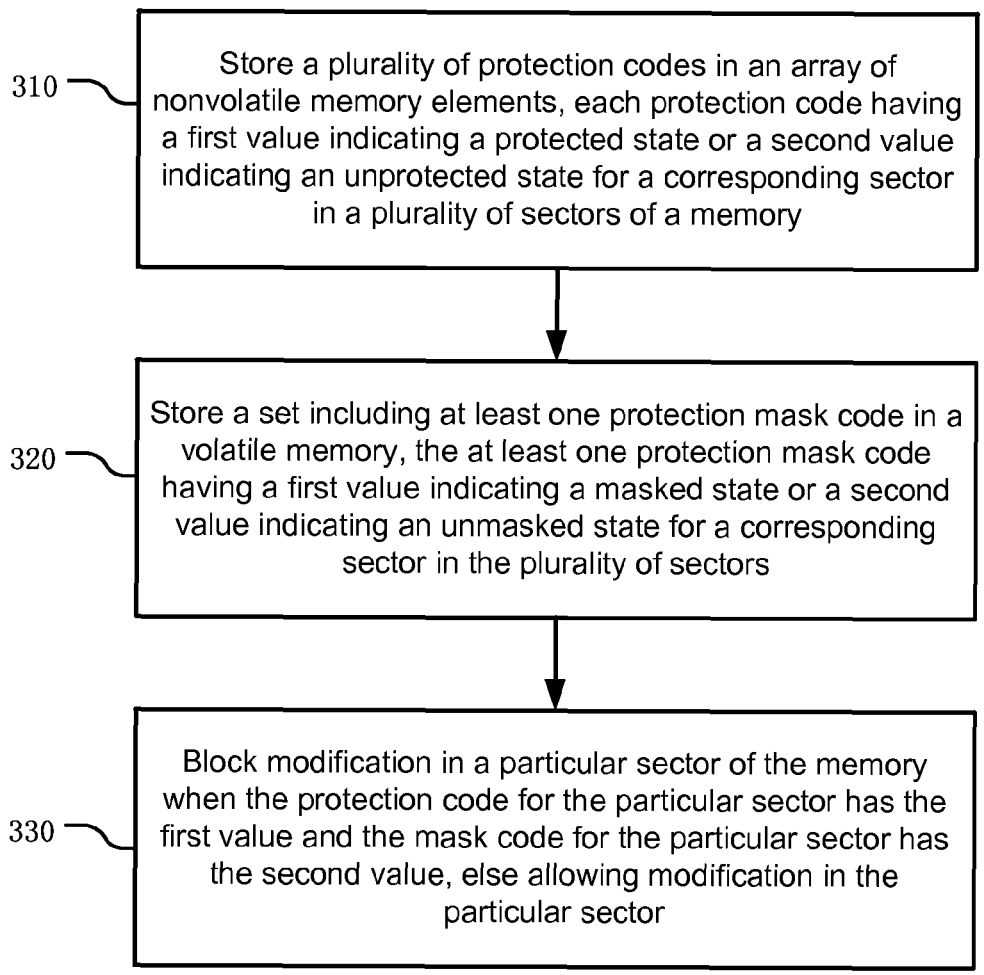
FIG. 3 is a flow chart of an example method for protecting data on a memory device using protection codes and mask codes.

FIG. 3 is a flow chart of an example method for protecting data on a memory device using protection codes and mask codes. The method of FIG. 3 can be implemented by the controller 169, protection codes SPB and volatile protection mask code TUB, and other suitable components of the integrated circuit 175 for protecting data stored in the memory array 160.

The method of FIG. 3 starts at Step 310. At Step 310, the controller stores a plurality of protection codes (SPB) in the integrated circuit 175. Each protection code has a first value indicating a protected state and a second value indicating an unprotected state for a corresponding sector of memory cells in the memory array 160. The protection codes are stored in memory elements such that the protection codes are maintained during a power-down event of the integrated circuit 175. A power-down event can be an event when power is not maintained (lost) for the integrated circuit 175 or a portion of the integrated circuit 175 (e.g., the memory elements storing the protection codes or another component of the integrated circuit 175).

In this example, the controller 169 stores protection codes in an array of nonvolatile memory elements such as an array of flash memory cells. The controller 169 performs an erase operation on the array of flash memory cells to set all the protection codes stored in the array of flash memory cells to the second value (unprotected state). The controller 169 performs a program operation on a particular flash memory cell in the array to set the protection code stored in the particular flash memory cell to the first value (protected state). The controller 169 can perform the erase operation or program operation based on a request from a system (e.g., computer system 210) incorporating the integrated circuit 175 (or a request from a user of the system).

At Step 320, the controller 169 stores a set including at least one protection mask code (TUB) in the integrated circuit 175. A protection mask code has a first value indicating a masked state or a second value indicating an unmasked state for a corresponding sector in the memory array 160. A protection mask code is stored in a memory element such that the protection mask code is cleared during a power-down event of the integrated circuit 175. The power-down event can be an event when power is not maintained (lost) for the integrated circuit 175 or a portion of the integrated circuit 175 (e.g., the memory element storing the protection mask code or another component of the integrated circuit 175).

In this example, the controller 169 stores the set including at least one protection mask code in one or more volatile memory elements such as static random-access memory (SRAM) cells in the integrated circuit 175. The controller 169 performs a set operation on selected volatile memory cells to set the protection mask codes stored in the selected volatile memory cells from the second value (unmasked state) to the first value (masked state). The controller 169 performs a reset operation on selected volatile memory cells to reset the protection mask codes stored in the selected volatile memory cells from the first value (masked state) to the second value (unmasked state). The controller 169 can perform the set or reset operation based on a request from a system (e.g., computer system 210) incorporating the integrated circuit 175 (or a request from a user of the system).

At Step 330, the controller 169 blocks modification in a particular sector of the memory array 160 when the protection code for the particular sector has the first value (protected state) and the protection mask code for the particular sector has the second value (unmasked state). Otherwise the controller 169 allows modification in the particular sector.

Table 1 below illustrates state combinations of the protection code and mask code for a sector of the memory array 160 and protection state for data stored in the sector.

TABLE 1

| Mask code (TUB) | Protection code (SPB) | Stored data |
| --- | --- | --- |
| Unmasked | Unprotected | Unprotected |
| Unmasked | Protected | Protected |
| Masked | Unprotected | Unprotected |
| Masked | Protected | Unprotected |

As shown in Table 1, if the protection mask code has the second value (unmasked state), the protection state for the stored data is determined by the protection code. If the protection mask code has the first value (masked state), the protection mask code "masks" the value of the protection code and the stored data is always unprotected.

Figure 4:
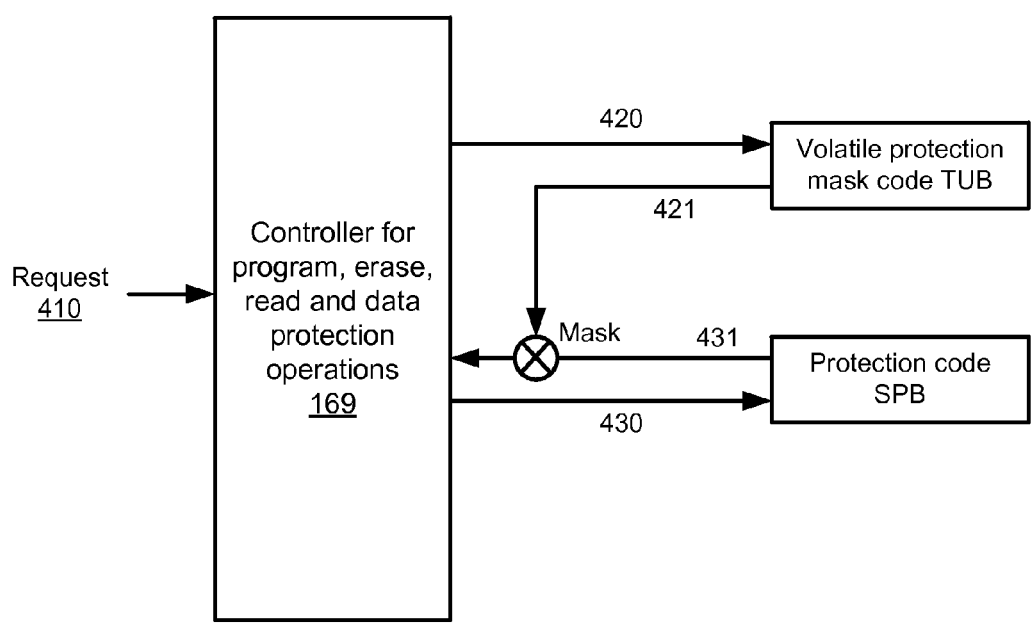
FIG. 4 is a simplified block diagram of a memory device including protection codes and mask codes.

FIG. 4 is a simplified block diagram of a memory device including protection codes and mask codes, such as the integrated circuit 175. In this example, the controller 169 may receive from a system incorporating the integrated circuit 175 (e.g., computer system 210 in FIG. 2) one or more requests (410) to modify (program or erase) data stored in the memory array 160, change values of the protection codes, or change values of the protection mask codes. The request 410 can be initiated by an operating system or a software program executed by the processor 214 of the computer system 210. The request 410 can also be based on a user command.

For example, in response to a request 410 to change values of the protection codes, the controller 169 accesses the nonvolatile memory array storing the protection codes and updates the stored protection codes according to the request (430). Similarly, in response to a request to change values of the mask codes, the controller 169 accesses the set of volatile memory cells storing the mask codes and updates the stored mask codes according to the request (420).

In response to a request 410 to modify data stored in the memory array 160, the controller 169 first determines a particular sector that includes the data corresponding to the request. The controller 169 then determines the value of the protection code (431) and the value of the mask code (421) for the particular sector. The controller 169 masks the value of the protection code with the value of the mask code and determines whether modification to data stored in the particular sector is allowable as described with Table 1 above. If modification to data stored in the particular sector is allowable, the controller 169 proceeds to perform an operation (e.g., an erase operation or a program operation) corresponding to the request 410. If modification to data stored in the particular sector is not allowed, the controller 169 denies the request 410 and sends back an error message to the system incorporating the integrated circuit 175.

The sectors of memory cells in the memory array 160 can be protected by different combinations of one or more protection codes and one or more mask codes. For example, each sector can have a corresponding protection code (stored in the nonvolatile memory array) and a corresponding mask code (stored in the volatile memory element). For another example, each sector has a corresponding protection code, while all sectors in the memory array 160 has one mask code. In this way, all sectors can be unprotected by setting the one mask code to the first value (masked state). For yet another example, all sectors in the memory array 160 have one protection code, while each sector has a corresponding mask code. In this way, all sectors can be protected by default (i.e., the one protection code has the first value). One or more sectors can be unprotected by setting the corresponding mask codes to the first value (masked state).

The combination of the protection codes and mask codes (as described with FIGS. 3 and 4) provides a flexible method for protecting data stored in the integrated circuit 175. For example, since the protection codes stored in the nonvolatile memory array are maintained during a power-down event, the protection codes can be used as a default protection setting for the sectors in the memory array 160 after the integrated circuit 175 is powered up. The mask codes can be used to dynamically adjust protection states for one or more particular sectors by setting the mask codes corresponding to the particular sectors to the first value (masked state), thus masking the values of the protection codes corresponding to the particular sectors and unprotecting these particular sectors.

In some cases, it is desirable to keep a sector of memory cells protected (or unprotected) after its corresponding protection code or mask code is set. Additional lock codes for the protection lock codes and mask codes described in FIGS. 3 and 4 can be used to keep a sector of memory cells protected (or unprotected) after its corresponding protection code or mask code is set, as illustrated in FIGS. 5 and 6 below.

Figure 5:
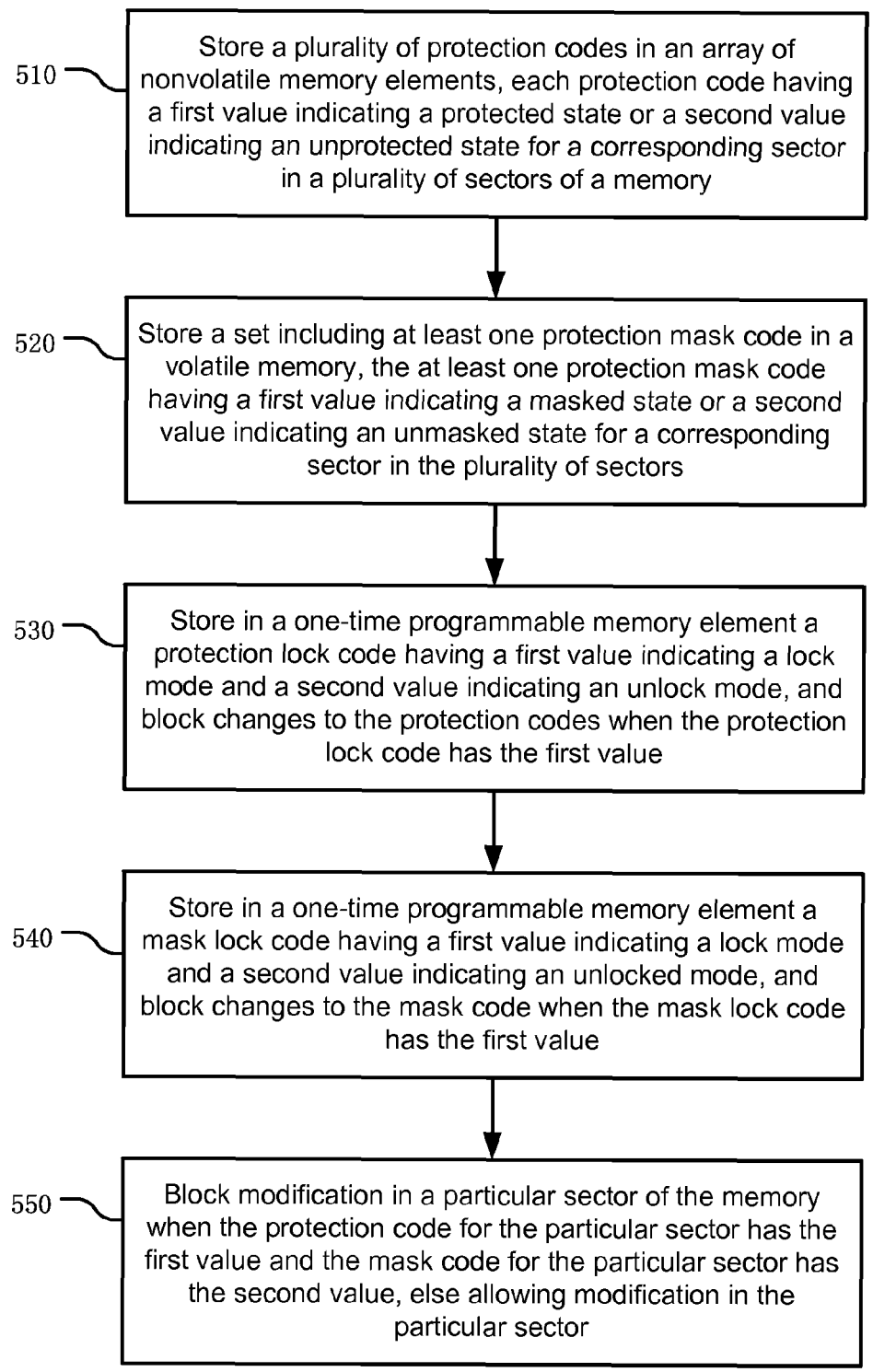
FIG. 5 is a flow chart of an example method for protecting data on a memory device using protection codes, mask codes, protection lock code, and mask lock code.
Figure 6:
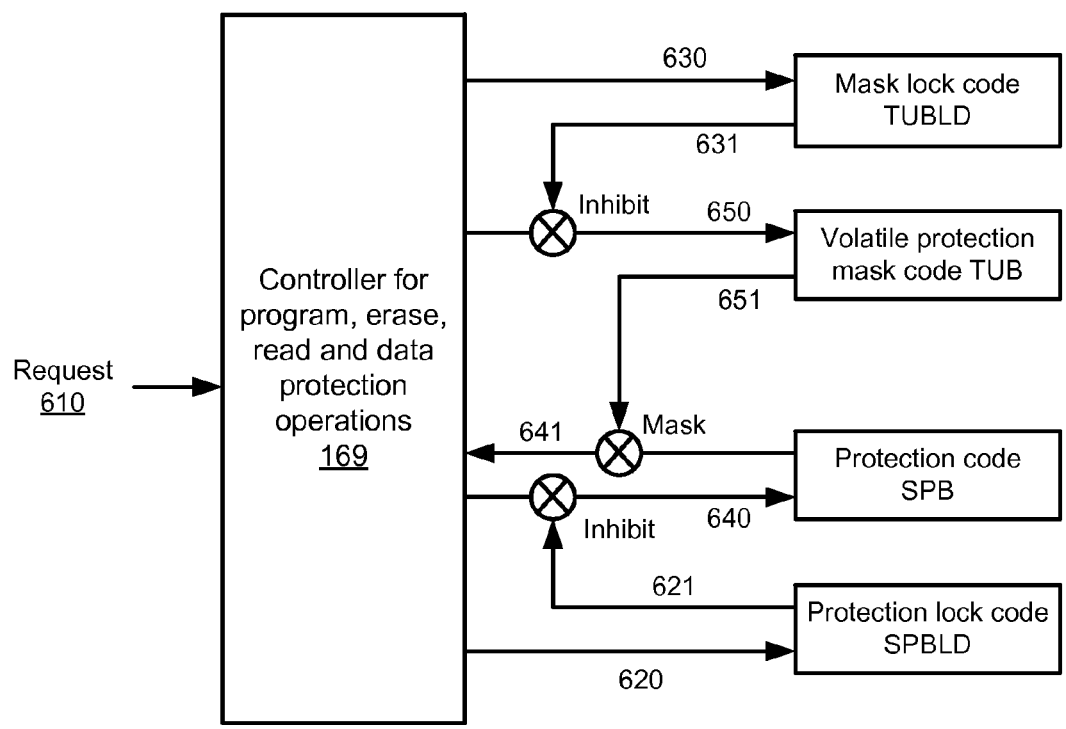
FIG. 6 is a simplified block diagram of a memory device including protection codes, mask codes, protection lock code, and mask lock code.

FIG. 5 is a flow chart of an example method for protecting data on a memory device using protection codes, mask codes, protection lock code, and mask lock code. The method of FIG. 5 can be implemented by the controller 169, protection codes SPB, volatile protection mask code TUB, protection lock code SPBLD, and mask lock code TUBLD, and other suitable components of the integrated circuit 175 for protecting data stored in the memory array 160.

The method of FIG. 5 starts at Step 510. As at Step 310 of FIG. 3, at Step 510, the controller 169 stores a plurality of protection codes (SPB) in an array of nonvolatile memory elements (e.g., an array of flash memory cells) in the integrated circuit 175. Each protection code has a first value indicating a protected state and a second value indicating an unprotected state for a corresponding sector of memory cells in the memory array 160. The controller 169 performs an erase operation on all nonvolatile memory elements in the array to set the protection code stored in the memory elements to the second value (unprotected state). The controller 169 performs a program operation on a particular nonvolatile memory element in the array to set the protection code stored in the particular nonvolatile memory element to the first value (protected state).

As at Step 320 of FIG. 3, at Step 520, the controller 169 stores a set including at least one protection mask code (TUB) in a volatile memory element (e.g., an SRAM cell) in the integrated circuit 175. A protection mask code has a first value indicating a masked state or a second value indicating an unmasked state for a corresponding sector in the memory array 160. The controller 169 performs a set operation on the volatile memory element to set the protection mask codes stored in the volatile memory from the second value (unmasked state) to the first value (masked state). The controller 169 performs a reset operation on the volatile memory element to reset the protection mask codes stored in the volatile memory from the first value (masked state) to the second value (unmasked state).

At Step 530, the controller 169 stores a protection lock code (SPBLD) in a one-time programmable memory element (e.g., an antifuse, or a flash memory cell without erase supporting circuit) in the integrated circuit 175. The protection lock code has a first value indicating a lock mode and a second value indicating an unlocked mode. The controller 169 blocks changes to the protection codes stored in the nonvolatile memory array when the protection lock code has the first value (lock mode). The controller 169 can set the protection lock code to the first value or the second value based on a request from a system (e.g., computer system 210) incorporating the integrated circuit 175 (or a request from a user of the system).

At Step 540, the controller 169 stores a mask lock code (TUBLD) in a one-time programmable memory element (e.g., an antifuse, or a flash memory cell without erase supporting circuit) in the integrated circuit 175. The mask lock code has a first value indicating a lock mode and a second value indicating an unlocked mode. The controller 169 blocks changes to mask codes stored in the volatile memory elements when the mask lock code has the first value (lock mode). The controller 169 can set the mask lock code to the first value or the second value based on a request from a system (e.g., computer system 210) incorporating the integrated circuit 175 (or a request from a user of the system).

As at Step 330 of FIG. 3, at Step 550, the controller 169 blocks modification in a particular sector of the memory array 160 when the protection code for the particular sector has the first value (protected state) and the protection mask code for the particular sector has the second value (unmasked state). Otherwise the controller 169 allows modification in the particular sector. As described with Table 1, if the protection mask code has the second value (unmasked state), the protection state for the stored data is determined by the protection code. If the protection mask code has the first value (masked state), the protection mask code masks the value of the protection code and the stored data is always unprotected.

FIG. 6 is a simplified block diagram of a memory device including protection codes, mask codes, protection lock code, and mask lock code, such as the integrated circuit 175. In this example, the controller 169 may receive from a system incorporating the integrated circuit 175 (e.g., computer system 210 in FIG. 2) one or more requests (610) to modify (program or erase) data stored in the memory array 160, change values of the protection codes or the mask codes, or program the protection lock code or the mask lock code. The request 610 can be initiated by an operating system or a software program executed by the processor 214 of the computer system 210. The request 410 can also be based on a user command.

For example, in response to a request 610 to modify data stored in the memory array 160, the controller 169 first determines a particular sector that includes the data corresponding to the request. The controller 169 determines the value of the protection mask code for the particular sector (651). The controller 169 determines the value of the protection code for the particular sector (641). The controller 169 masks the value of the protection code with the value of the mask code and determines whether modification to data stored in the particular sector is allowable as described with Table 1 above. If modification to data stored in the particular sector is allowable, the controller 169 proceeds to perform an operation (e.g., an erase operation or a program operation) corresponding to the request 610. If modification to data stored in the particular sector is not allowed, the controller 169 denies the request 610 and returns an error message to the system incorporating the integrated circuit 175.

In response to a request 610 for programming the protection lock code, the controller 169 sets the protection lock code to the first value (lock mode) by programming the one-time programmable memory element for the protection lock code (620).

In response to a request 610 for changes to the protection codes, the controller 169 first determines whether the protection lock code has the first value (lock mode). If the protection lock code has the first value, then the controller 169 blocks changes to the protection codes (621). Otherwise the controller 169 allows changes to the protection codes (640).

In response to a request 610 for programming the protection mask lock code, the controller 169 sets the protection mask lock code to the first value (lock mode) by programming the one-time programmable memory element for the mask lock code (630). The controller 169 also resets all protection mask codes to the second value (unmasked state) (650), and thereafter blocks changes to the protection mask codes (631). In this way, mask codes are locked out from masking protection codes for all sectors in the memory array 160 after the protection mask lock code is set to the first value (lock mode).

In another embodiment, after setting the protection mask lock code to the first value (lock mode), the controller 169 blocks changes that sets selected mask codes from the second value (unmasked state) to the first value (masked state), and allows changes that reset selected mask codes from the first value (masked state) to the second value (unmasked state). In this way, no protection codes can be further masked by the mask codes after the protection mask lock code is set to the first value (lock mode).

In addition to using two different one-time programmable memory elements for storing the protection lock code and the mask lock code, different types or combinations of memory elements can be used to store the protection lock code and the mask lock code. For example, a single one-time programmable memory element can be used to store a single lock code having a first value indicating a lock mode and second value indicating an unlocked mode. The single lock code represents both the protection lock code and the mask lock code. After programming the one-time programmable memory element and setting the lock code to the first value (e.g., in response to a request 610), the controller 169 blocks changes to the protection codes, sets the mask codes to the second value (unmasked state), and thereafter blocks changes to the mask codes or protection codes.

For another example, a set of one-time programmable memory elements are used to store mask lock codes. Each one of the set of one-time programmable memory elements stores a mask lock code for a particular sector of memory cells in the memory array 160. Each mask lock code has a first value indicating a lock mode and a second value indicating an unlocked mode. In response to a request 610 for programming a mask lock code for a particular sector, the controller 169 sets the mask lock code for the particular sector to the first value (lock mode) by programming the one-time programmable memory element storing the mask lock code for the particular sector. The controller 169 also sets the mask code for the particular sector to the second value (unmasked state), and thereafter blocks changes to the mask code for the particular sector. In this way, the mask code for a particular sector (instead of all sectors) is locked out from masking the protection code for the particular sector after the protection mask lock code (for the particular sector) is set to the first value (lock mode).

The mask lock code and the protection lock code illustrated in FIG. 6 can be stored in password protected memory elements. For example, the protection lock code can be stored in a password protected memory element in the integrated circuit 175. At an initiation event (e.g., when the integrated circuit 175 is powered on), the protection lock code is set to the first value (lock mode), thus blocking changes to the protection codes. The protection lock code can be reset to the second value (unlocked mode) with a password (e.g., a 64-bit number provided by a user of the system incorporating the integrated circuit 175). After the protection lock code is reset to the second value (unlocked mode), the controller 169 allows changes to the protection codes. The controller 169 can set the protection lock code to the first value (e.g., in response to a request 610), thus blocking further changes to the protection codes. In this way, the protection codes stored in the nonvolatile memory array are maintained through a power-down and power-up cycle, and cannot be changed without providing a password.

The mask lock code can be stored in a password protected memory element in the integrated circuit 175. At an initiation event (e.g., when the integrated circuit 175 is powered on), the controller 169 sets the mask lock code to the first value (lock mode), thus blocking changes to the protection mask codes. The controller 169 also resets the mask codes to the second value (unmasked state). In this way, the protection codes are not masked by the mask codes when the integrated circuit 175 is power up. The mask lock code can be reset to the second value (unlocked mode) with a password (e.g., a 64-bit number provided by a user of the system incorporating the integrated circuit 175). After the mask lock code is reset to the second value (unlocked mode), the controller 169 allows changes to the protection mask codes. The controller 169 can set the mask lock code to the first value (e.g., in response to a request 610), thus blocking further changes to the protection mask codes.

The protection lock code can be stored in a volatile memory element (e.g., an SRAM cell) in the integrated circuit 175. At an initiation event (e.g., when the integrated circuit 175 is powered on), the controller 169 sets the protection lock code to the second value (unlocked state), thus allowing changes to the protection codes. In response to a user command (e.g., via the request 610), the controller 169 sets the protection lock code to the first value (lock state), thus blocking changes to the protection codes. The protection lock code cannot be set to the second value (unlocked state) until another initiation event (e.g., power on or hardware reset).

The mask lock code can be stored in a volatile memory element (e.g., an SRAM cell) in the integrated circuit 175. At an initiation event (e.g., when the integrated circuit 175 is powered on), the controller 169 sets the mask lock code to the second value (unlocked state), thus allowing changes to the mask codes. In response to a user command (e.g., via the request 610), the controller 169 sets the mask lock code to the first value (lock state), thus blocking changes to the mask codes. The mask lock code cannot be set to the second value (unlocked state) until another initiation event (e.g., power-on or hardware reset).

Figure 7:
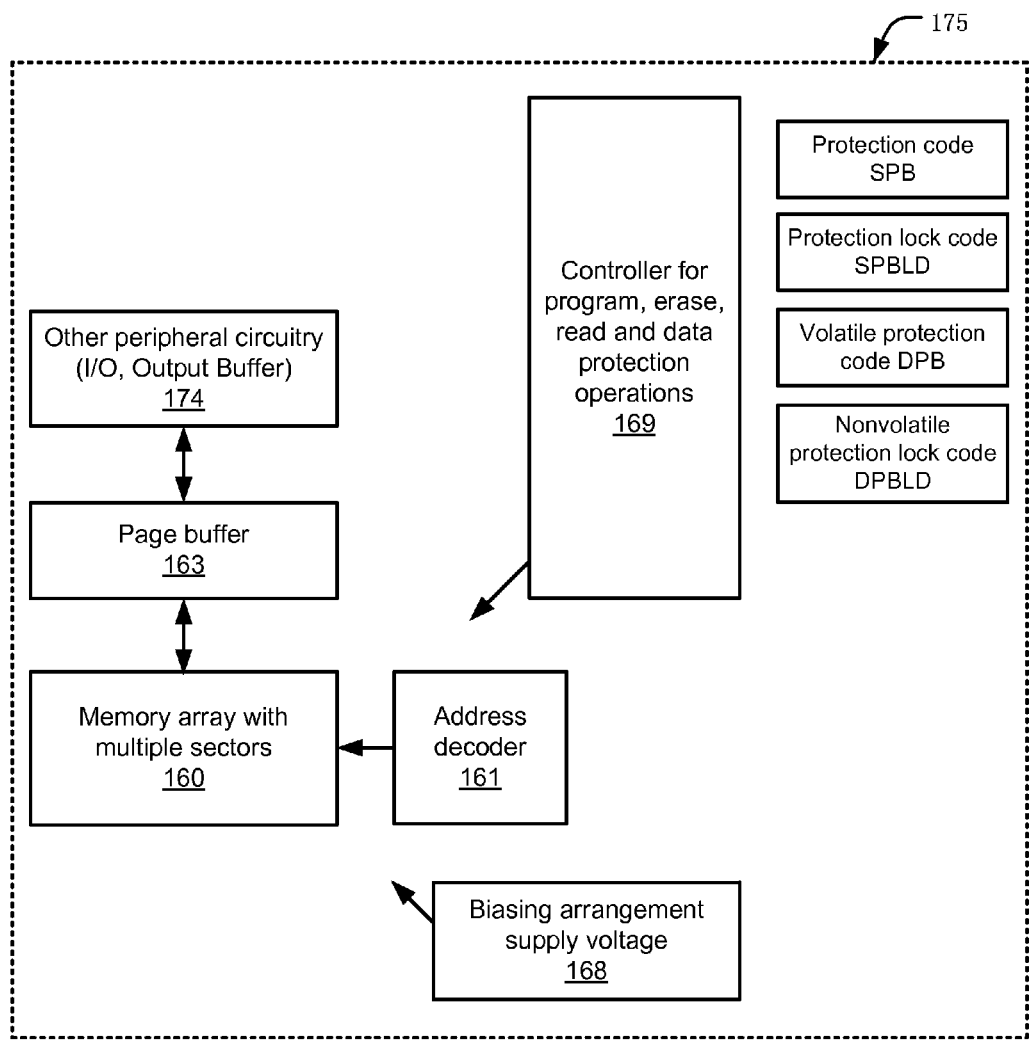
FIG. 7 is a simplified block diagram of another embodiment of an integrated circuit including a memory.

FIG. 7 is a simplified block diagram of another embodiment of the integrated circuit 175. In this example, the integrated circuit 175 includes first protection codes SPB ("Solid Write Protect Bits"), a protection lock code SPBLD ("SPB Lockdown Bit"), second protection codes DPB ("Dynamic Write Protection Bits"), and a protection lock code DPBLD ("DPB Lockdown Bit") for protection states of one or more sectors in the memory array 160, as described in more detail below.

Figure 8:
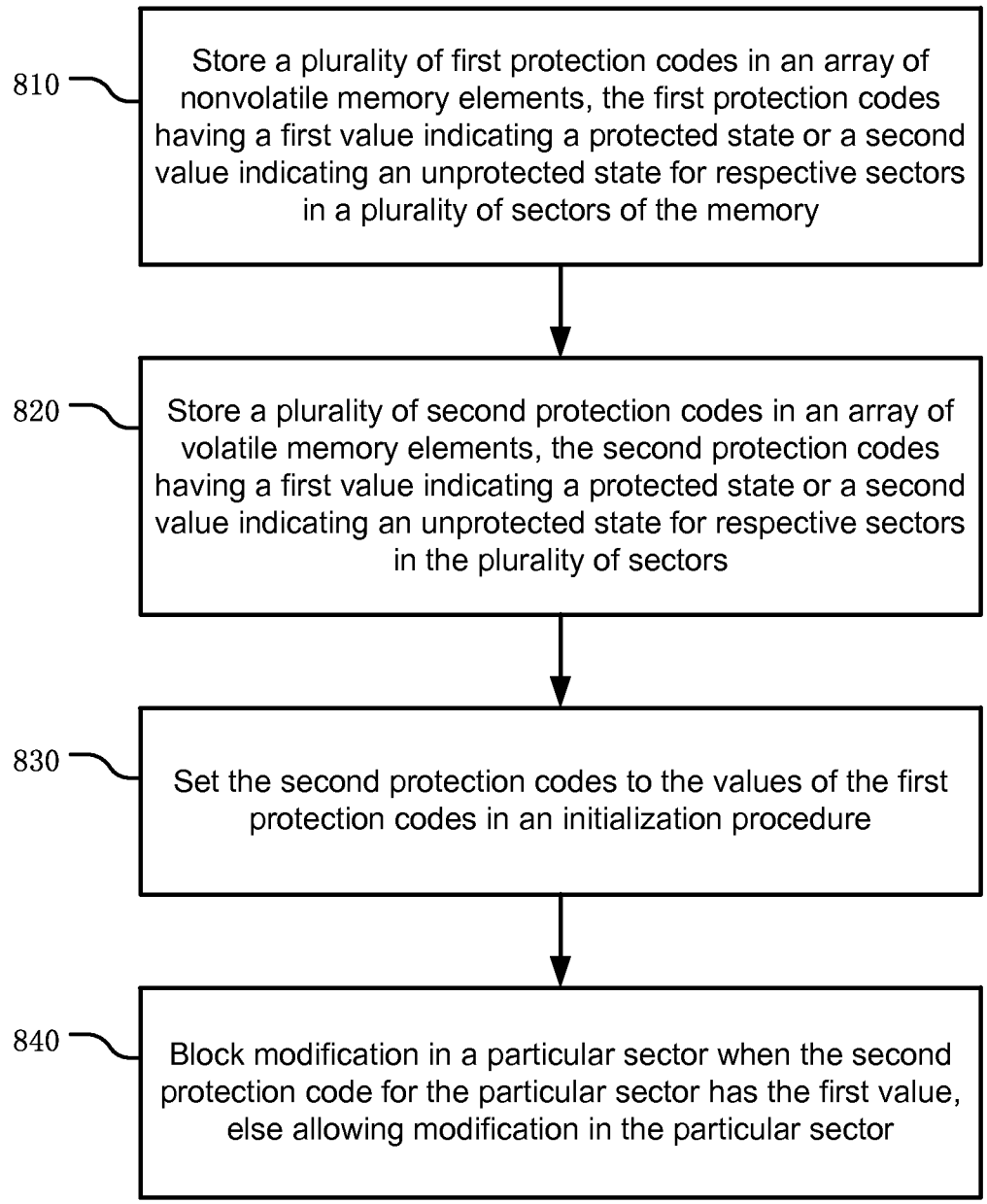
FIG. 8 is a flow chart of an example method for protecting data on a memory device using nonvolatile protection codes and volatile protection codes.

FIG. 8 is a flow chart of an example method for protecting data on a memory device using nonvolatile protection codes and volatile protection codes. The method of FIG. 8 can be implemented by the controller 169, the first protection codes SPB and the second protection codes DPB, and other suitable components of the integrated circuit 175 for protecting data stored in the memory array 160.

The method of FIG. 8 starts at Step 810. At Step 810, the controller 169 stores a plurality of first protection codes (SPB) in the integrated circuit 175. Each first protection code has a first value indicating a protected state and a second value indicating an unprotected state for its corresponding sector of memory cells in the memory array 160. The first protection codes are stored in the integrated circuit 175 such that the first protection codes are maintained during a power-down event.

In this example, the controller 169 stores the first protection codes in an array of nonvolatile memory elements such as an array of flash memory cells. The controller 169 performs an erase operation on the nonvolatile memory array to set all the first protection codes to the second value (unprotected state). The controller 169 performs a program operation on a selected first protection code stored in the nonvolatile memory array to set the selected first protection code to the first value (protected state). The controller 169 can perform the erase operation or program operation based on a request from a system (e.g., computer system 210) incorporating the integrated circuit 175 (or a request from a user of the system).

At Step 820, the controller 169 stores a plurality of second protection codes (DPB) in the integrated circuit 175. Each second protection code has a first value indicating a protected state or a second value indicating an unprotected state for a corresponding sector of memory cells in the memory array 160. The second protection codes are stored in the integrated circuit 175 such that the second protection codes are cleared during a power down event.

In this example, the controller 169 stores the plurality of second protection codes in an array of volatile memory elements (e.g., an array of SRAM cells). The controller 169 performs a set operation on selected volatile memory elements to set the second protection codes stored in the selected volatile memory elements from the second value (unprotected state) to the first value (protected state). The controller 169 performs a reset operation on selected volatile memory elements to reset the second protection codes stored in the selected volatile memory elements from the first value (protected state) to the second value (unprotected state).

At Step 830, the controller 169 sets the second protection codes to the values of the first protection codes in an initialization procedure (e.g., when the integrated circuit 175 is powered up). That is, the values of the first protection codes are copied to the second protection codes for respective sectors in an initialization procedure.

At Step 840, the controller 169 blocks modification (e.g., an erase or program operation) in a particular sector when the second protection code for the particular sector has the first value (protected state). Otherwise the controller 169 allows modification in the particular sector. That is, the protection state of a particular sector of memory cells in the memory array 160 is determined by the value of the second protection code of the particular sector.

Since the first protection codes are stored in the nonvolatile memory array and maintained during a power down event, values of the first protection codes serve as a default protection setting for the sectors in the memory array 160 when the power supply resumes for the integrated circuit 175 (e.g., in an initialization procedure).

Figure 9:
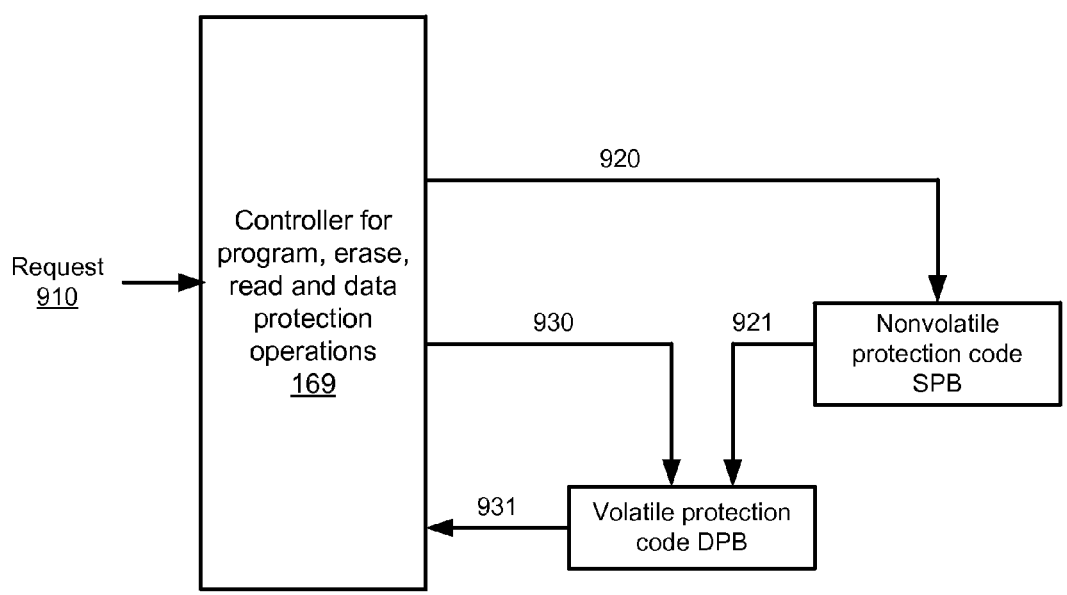
FIG. 9 is a simplified block diagram of a memory device including nonvolatile protection codes and volatile protection codes.

FIG. 9 is a simplified block diagram of a memory device including nonvolatile protection codes and volatile protection codes, such as the integrated circuit 175. In this example, the controller 169 may receive from a system incorporating the integrated circuit 175 (e.g., computer system 210 in FIG. 2) one or more requests (910) to modify (program or erase) data stored in the memory array 160, or change the first or second protection codes. The request 910 can be initiated by an operating system or a software program executed by the processor 214 of the computer system 210. The request 910 can also be based on a user command.

For example, in response to a request 910, the controller 169 may set the values for the first protection codes (920) or the second protection codes (930). In an initialization procedure, the controller 169 copies values of the first protection codes to the second protection codes for respective sectors (921).

In response to a request 910 for modifying data stored in the memory array 160, the controller 169 first determines a particular sector (of the memory array 160) that includes the data corresponding to the request. The controller 169 determines the second protection code for the particular sector (931). If the second protection code for the particular sector has the second value (unprotected state), the controller 169 proceeds to allow modification of the data corresponding to the request. If the second protection code of the particular sector has the first value (protected state), the controller 169 blocks modification of the data corresponding to the request, and returns an error message (to the system incorporating the integrated circuit 175).

The combination of the first protection codes (SPB) and the second protection codes (DPB) provides a flexible method for protecting data stored in the integrated circuit 175. The first protection codes (as stored in the nonvolatile memory elements) are maintained during a power-down event, and are used as a default protection setting when power resumes for the integrated circuit 175. Protection states for different sectors of the memory array 160 can be dynamically and separately changed while the integrated circuit 175 is powered by changing values for corresponding second protection codes, without changing the first protection.

The sectors of memory cells in the memory array 160 can be protected by different combinations of one or more first protection codes (SPB) and one or more second protection codes (DPB). For example, all sectors can have one first protection code. Each sector has its corresponding second protection code. In this way, all sectors are protected (or unprotected) as default. Protection states for one or more sectors can be changed by setting their respective second protection codes.

In addition to determining the values for the second protection codes (DPB) in an initiation procedure, the first protection codes (SPB) can also determine whether the second protection codes can be modified after the initiation procedure, as described with FIGS. 10 and 11 below.

Figure 10:
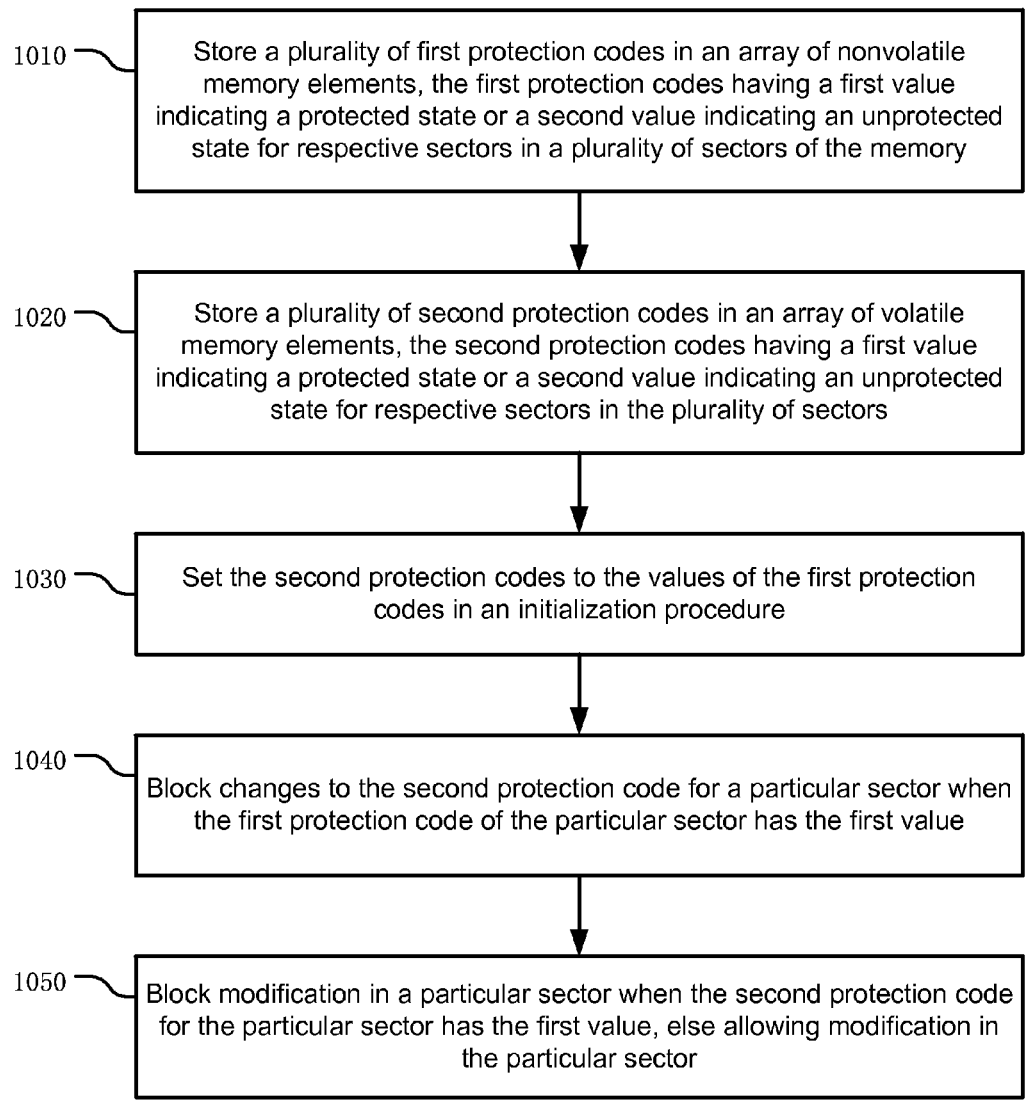
FIG. 10 is a flow chart of an example method for protecting data on a memory device using nonvolatile protection codes, volatile protection codes, and protection lock code.

FIG. 10 is a flow chart of an example method for protecting data on a memory device using nonvolatile protection codes, volatile protection codes, and protection lock code. The method of FIG. 10 can be implemented by the controller 169, the first protection codes SPB, the second protection codes DPB, and other suitable components of the integrated circuit 175 for protecting data stored in the memory array 160.

The method of FIG. 10 starts at Step 1010. As at Steps 810, 820 and 830 of FIG. 8, the controller 169 stores a plurality of first protection codes (SPB) in an array of nonvolatile memory elements (1010), stores a plurality of second protection codes (DPB) in an array of volatile memory elements (1020), and sets the second protection codes to the values of the first protection codes in an initialization procedure (1030). As described with FIG. 8, the first protection codes have a first value indicating a protected state or a second value indicating an unprotected state for respective sectors in the memory array 160. The second protection codes have a first value indicating a protected state or a second value indicating an unprotected state for respective sectors in the memory array 160.

In addition, at Step 1040, the controller 169 blocks changes to the second protection code for a particular sector when the first protection code of the particular sector has the first value (protected state). At Step 1050, the controller 169 blocks modification in a particular sector when the second protection code for the particular sector has the first value (protected state). Otherwise the controller 169 allows modification in the particular sector. In this way, the second protection code (DPB) of a particular sector determines whether the particular sector is protected. Meanwhile, the first protection code (SPB) determines the values of the second protection code in an initiation procedure, and determines whether the value of the second protection code can be changed after the initiation procedure.

Figure 11:
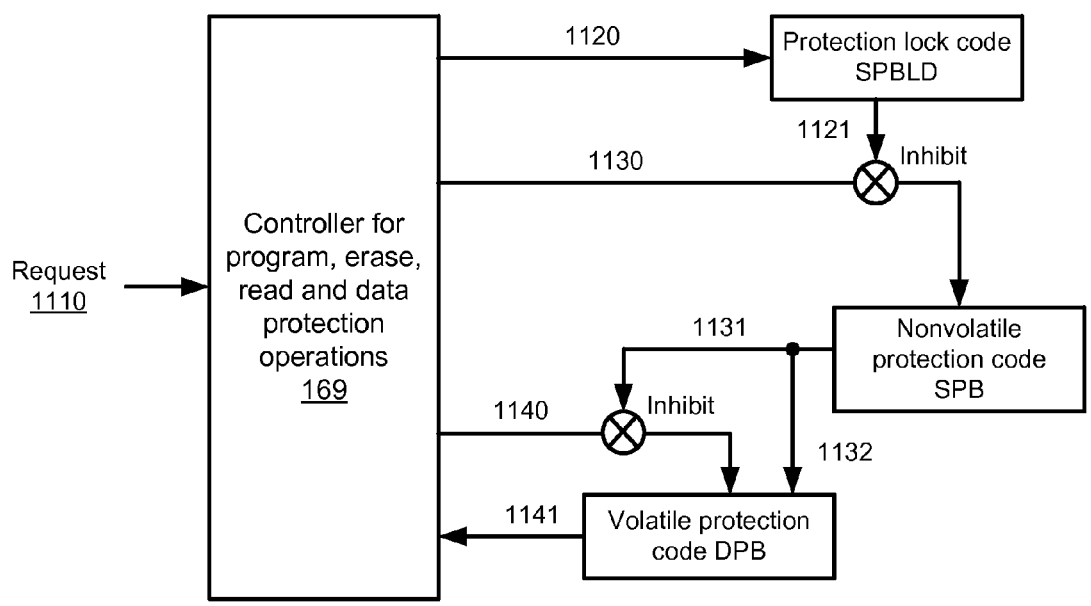
FIG. 11 is a simplified block diagram of a memory device including nonvolatile protection codes, volatile protection codes, and protection lock code.

FIG. 11 is a simplified block diagram of a memory device including nonvolatile protection codes, volatile protection codes, and protection lock code. In this example, the controller 169 may receive from a system incorporating the integrated circuit 175 (e.g., computer system 210 in FIG. 2) one or more requests (1110) to modify (program or erase) data stored in the memory array 160, or change the first protection codes (SPB), the second protection codes (DPB), or a protection lock code (SPBLD). The protection lock code (SPBLD) is stored in a one-time programmable memory element in the integrated circuit 175. The protection lock code has a first value indicating a lock mode and a second value indicating an unlocked mode. Changes to the first protection codes (SPD) are blocked when the protection lock code has the first value (lock mode).

The request 1110 can be initiated by an operating system or a software program executed by the processor 214 of the computer system 210. The request 1110 can also be based on a user command.

For example, in response to a request 1110, the controller 169 can set the protection lock code SPBLD to the first value (lock state) by programming the one-time programmable memory element storing the protection lock code (1120). Once the protection lock code is set to the first value, changes to all first protection codes (SPB) are blocked (1121).

In response to a request 1110 for setting all the first protection codes (SPB) to the second value (unprotected state) and when the protection lock code has the second value (unlocked mode), the controller 169 sets all the first protection codes to the second value by performing an erase operation on the nonvolatile memory elements storing the first protection codes (1130).

In response to a request 1110 for setting a selected first protection code (SPB) for a particular sector to the first value (protected state) and when the protection lock code has the second value (unlocked mode), the controller 169 sets the selected first protection code to the first value by programming the nonvolatile memory element storing the selected first protection code (1130). The controller 169 also sets the second protection code (DPB) for the particular sector to the first value (protected state) (1132).

In response to a request 1110 for changing the value of a second protection code DPB for a particular sector, the controller 169 determines the value of the first protection code (SPB) for the particular sector (1131). If the first protection code for the particular sector has the second value (unprotected state), the controller 169 sets or resets the second protection code for the particular sector based on the request 1110 (1140). If the first protection code for the particular sector has the first value (protected state), the controller blocks changes to the second protection code for the particular sector.

Here, if the first protection code for a particular sector has the first value (protected state), the second protection code for the particular sector always has the first value since the second protection code is initialized to the first protection code and changes to the second protection code are blocked. Thus, the particular sector is always protected ("locked") unless the first protection code is changed from the first value to the second value (unprotected state).

In response to a request 1110 for modification of data in the memory array 160, the controller 169 first determines a particular sector in the memory array 160 that includes the data corresponding to the request. The controller 169 determines the second protection code (DPB) for the particular sector (1141). If the second protection code for the particular sector has the second value (unprotected state), the controller 169 proceeds to allow modification of the data corresponding to the request. Otherwise, the controller 169 blocks modification of the data corresponding to the request, and returns an error message (to the system incorporating the integrated circuit 175).

As described with Step 1030 of FIG. 10, the values of the first protection codes (SPB) are copied to the second protection codes (DPB) for respective sectors in an initialization procedure. In another embodiment, all the second protection codes are set to the first value (protected state) in an initialization procedure (i.e., all sectors are protected by default). In this way, the second protection codes (DPB) are set to protected state when the integrated circuit 175 is powered up. In yet another embodiment, all the second protection codes are set to the first value (protected state) in an initialization procedure, for a period of time before the second protection codes are set to the values of the first protection codes in the initialization procedure.

The protection lock code (SPBLD) can be stored in a password protected memory element in the integrated circuit 175. At an initiation event (e.g., when the integrated circuit 175 is powered on), the protection lock code is set to the first value (lock mode), thus blocking changes to the first protection codes (SPB). The protection lock code can be reset to the second value (unlocked mode) with a password (e.g., a 64-bit number provided by a user of the system incorporating the integrated circuit 175). After the protection lock code is reset to the second value (unlocked mode), the controller 169 allows changes to the first protection codes. The controller 169 can set the protection lock code to the first value (e.g., in response to a request 1110), thus blocking further changes to the first protection codes. In this way, the first protection codes stored in the nonvolatile memory array are maintained through a power-down and power-up cycle, and cannot be changed without providing a password.

The protection lock code can be stored in a volatile memory element (e.g., an SRAM cell) in the integrated circuit 175. At an initiation event (e.g., when the integrated circuit 175 is powered on), the controller 169 sets the protection lock code to the second value (unlocked state), thus allowing changes to the protection codes. In response to a user command (e.g., via the request 1110), the controller 169 sets the protection lock code to the first value (lock state), thus blocking changes to the first protection codes. The first protection lock codes cannot be set to the second value (unlocked state) until another initiation event (e.g., power-on or hardware reset).

In another embodiment, a nonvolatile protection lock code DPBLD determines the initial values of the second protection codes DPB, and how the second protection codes are modified afterwards, as described with FIGS. 12 and 13 below.

Figure 12:
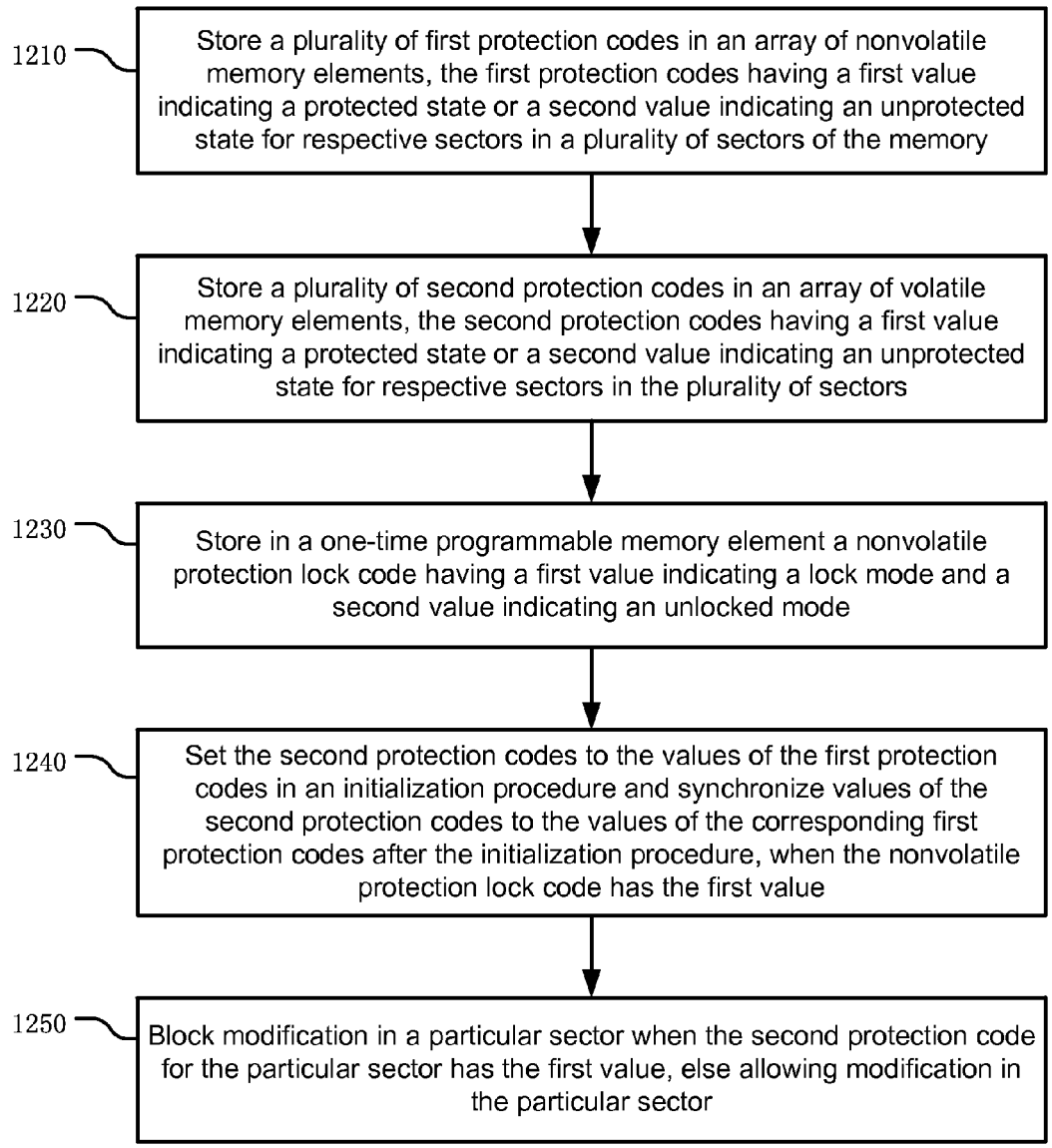
FIG. 12 is a flow chart of an example method for protecting data on a memory device using nonvolatile protection codes, volatile protection codes, nonvolatile protection code, and another protection lock code.

FIG. 12 is a flow chart of an example method for protecting data on a memory device using nonvolatile protection codes, volatile protection codes, nonvolatile protection code, and another protection lock code. The method of FIG. 12 can be implemented by the controller 169, memory elements storing the first protection codes SPB, the second protection codes DPB, and a nonvolatile protection lock code DPBLD, and other suitable components of the integrated circuit 175 for protecting data stored in the memory array 160.

The method of FIG. 12 starts at Step 1210. As at Steps 810 and 820 of FIG. 8, the controller 169 stores a plurality of first protection codes (SPB) in an array of nonvolatile memory elements (1210), and stores a plurality of second protection codes (DPB) in an array of volatile memory elements (1220). As described with FIG. 8, the first protection codes have a first value indicating a protected state or a second value indicating an unprotected state for respective sectors in the memory array 160. The second protection codes have a first value indicating a protected state or a second value indicating an unprotected state for respective sectors in the memory array 160.

In addition, at Step 1230, the controller 169 stores a nonvolatile protection lock code (DPBLD) in a one-time programmable memory element (e.g., an antifuse) in the integrated circuit 175. The nonvolatile protection lock code has a first value indicating a lock mode and second value indicating an unlocked mode.

At Step 1240, when the nonvolatile protection lock code has the first value (lock mode), the controller 169 sets the second protection codes (DPB) to the values of the first protection codes (SPB) in an initialization procedure (e.g., during power-on). After the initialization procedure, when a change is made to the first protection codes, the second protection codes are set to values of corresponding first protection codes. That is, the values of the first protection codes are copied to the second protection codes for respective sectors in the initialization procedure. After the initialization procedure, the values of the second protection codes are synchronized to the first protection codes for respective sectors. For example, when the first protection code of a particular sector of the memory array 160 is changed from the first value to the second value, the second protection code of the particular sector is also changed from the first value to the second value. For another example, when all the first protection codes are set to the second value (e.g., by an erase operation on the nonvolatile memory elements storing the first protection codes), all the second protection codes are also set to the second value (unprotected state).

At Step 1250, the controller 169 blocks modification in a particular sector when the second protection code for the particular sector has the first value (protected state). Otherwise the controller 169 allows modification in the particular sector.

Figure 13:
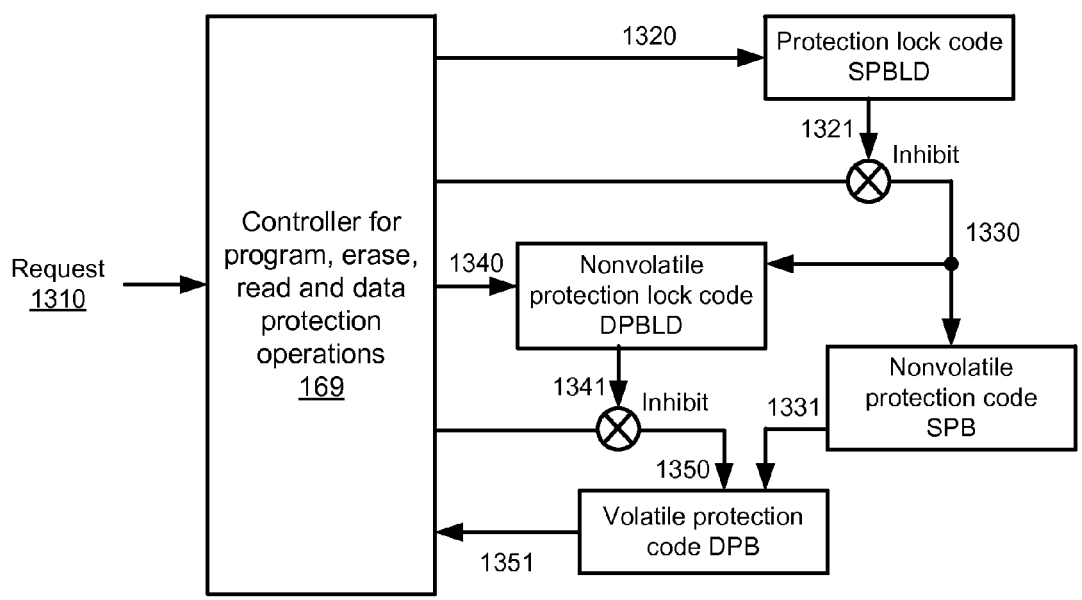
FIG. 13 is a simplified block diagram of a memory device including nonvolatile protection codes, volatile protection codes, nonvolatile protection code, and another protection lock code.

FIG. 13 is a simplified block diagram of a memory device including nonvolatile protection codes, volatile protection codes, nonvolatile protection lock code, and another protection lock code. In this example, the controller 169 may receive from a system incorporating the integrated circuit 175 (e.g., computer system 210 in FIG. 2) one or more requests (1310) to modify (program or erase) data stored in the memory array 160, or change the first protection codes (SPB), the second protection codes (DPB), the nonvolatile protection lock code (DPBLD), or another protection lock code (SPBLD). The protection lock code SPBLD is stored in a one-time programmable memory element in the integrated circuit 175. The protection lock code SPBLD has a first value indicating a lock mode and a second value indicating an unlocked mode. Changes to the first protection codes (SPD) are blocked when the protection lock code SPBLD has the first value (lock mode).

The request 1310 can be initiated by an operating system or a software program executed by the processor 214 of the computer system 210. The request 1310 can also be based on a user command.

For example, in response to a request 1310, the controller 169 may set the value for the nonvolatile protection lock code DPBLD (1340) or for the protection lock code SPBLD (1320).

In response to a request 1310 to set values for one or more first protection codes (SPB), the controller 169 first determines the value of the protection lock code SPBLD (1321). If the protection lock code has the first value (lock mode), the controller 169 blocks the request 1310. Otherwise the controller 169 proceeds to set values for the first protection codes (1330).

As described earlier, when the nonvolatile protection lock code DPBLD has the first value (lock mode), the controller 169 blocks requests to change the second protection codes (DPB) (1341). The second protection codes are initialized to the first protection codes (SPB), and synchronized to further changes to the first protection codes (1331).

When the nonvolatile protection lock code DPBLD has the second value (unlocked mode), the controller 169 resets all second protection codes (DPB) to the second value (unprotected mode) in an initialization procedure. After the initialization procedure, the controller 169 allows requests 1310 for changing values of the second protection codes. After the initialization procedure, if the first protection code for a particular sector is set to the first value (protected state), the corresponding second protection code for the particular sector is also set to the first value. The nonvolatile protection lock code DPBLD is also set to the first value (i.e., no further changes to the second protection codes are allowed).

Note that once the protection lock code is set to the first value, the second protection codes always have the values of the first protection codes since the second protection codes are initialized to the values of the first protection codes while changes to the second protection codes are blocked. Thus, the protection states for the sectors in the memory array 160 are effectively determined by the first protection codes.

In response to a request 1310 for modification of data in the memory array 160, the controller 169 first determines a particular sector in the memory array 160 that includes the data corresponding to the request. The controller 169 determines the second protection code (DPB) for the particular sector (1351). If the second protection code for the particular sector has the second value (unprotected state), the controller 169 proceeds to allow modification of the data corresponding to the request. Otherwise, the controller 169 blocks modification of the data corresponding to the request, and returns an error message (to the system incorporating the integrated circuit 175).

Instead of a single nonvolatile protection lock code DPBLD, a plurality of nonvolatile protection lock codes DPBLDs can be used to determine the initial values of respective second protection codes DPB, and to determine how the respective protection codes are modified afterwards. The plurality of nonvolatile protection lock codes DPBLDs are stored in an array of one-time programmable memory elements. Each nonvolatile protection lock code has a first value indicating a lock mode and a second value indicating an unlock mode for a corresponding sector of the sectors in the memory array 160.

When the nonvolatile protection lock code DPBLD for a particular sector has the first value (lock mode), the controller 169 blocks requests to change the second protection code (DPB) for the particular sector. The second protection code for the particular sector is initialized to the first protection code (SPB) for the particular sector, and synchronized to further changes to the first protection code for the particular sector.

When the nonvolatile protection lock code DPBLD for a particular sector has the second value (unlocked mode), the controller 169 resets the second protection code (DPB) for the particular sector to the second value (unprotected mode) in an initialization procedure. After the initialization procedure, the controller 169 allows requests 1310 for changing values of the second protection code for the particular sector. After the initialization procedure, if the first protection code for the particular sector is set to the first value (protected state), the corresponding second protection code for the particular sector is also set to the first value. The nonvolatile protection lock code DPBLD for the particular sector is also set to the first value (i.e., no further changes to the second protection codes are allowed).

Note that once the protection lock code for a particular sector is set to the first value, the second protection code for the particular sector always has the value of the first protection code for the particular sector since the second protection code is initialized to the value of the first protection code while changes to the second protection code are blocked. Thus, the protection state for the particular sector is effectively determined by the corresponding first protection code.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

What is claimed is:

1. A circuit comprising:
a memory array comprising a plurality of sectors;
a plurality of nonvolatile memory elements, each nonvolatile memory element in the plurality of nonvolatile memory elements storing a respective protection code having a first value indicating a protected state or a second value indicating an unprotected state for a corresponding sector in the plurality of sectors;
a set including at least one volatile memory element, a volatile memory element in the set storing a volatile protection mask code having a first value indicating a masked state or a second value indicating an unmasked state for a corresponding sector in the plurality of sectors; and
control logic coupled to the memory array, which blocks modification in a particular sector when the protection code for the particular sector has the first value which indicates the protected state and the mask code for the particular sector has the second value which indicates the unmasked state, else allows modification in the particular sector.

2. The circuit of claim 1, wherein the plurality of nonvolatile memory elements is configured for an erase operation which sets all the protection codes stored in the plurality to the second value which indicates the unprotected state, and for a program operation capable of setting individual selected protection codes stored in the plurality to the first value which indicates the protected state.

3. The circuit of claim 1, wherein the set includes at least one volatile memory element configured for an operation which sets the selected mask codes from the second value which indicates the unmasked state to the first value which indicates the masked state, and an operation with resets selected mask codes from the first value which indicates the masked state to the second value which indicates the unmasked state.

4. The circuit of claim 1, wherein the set including at least one volatile memory element includes a volatile memory element storing a mask code for all of the sectors in the plurality of sectors.

5. The circuit of claim 1, including a one-time programmable memory element storing a protection lock code having a first value indicating a lock mode and a second value indicating an unlocked mode, and wherein the control logic blocks changes to the protection codes in the plurality of nonvolatile memory elements when the protection lock code has the first value indicating the lock mode.

6. The circuit of claim 1, including a one-time programmable memory element storing a mask lock code having a first value indicating a lock mode and a second value indicating an unlocked mode, and wherein the control logic sets the mask code or mask codes in at least one volatile memory element to the second value indicating the unmasked state, and thereafter blocks changes to the mask code or mask codes when the mask lock code has the first value indicating the lock mode.

7. The circuit of claim 1, including a one-time programmable memory element storing a mask lock code having a first value indicating a lock mode and a second value indicating an unlocked mode, and wherein when the mask lock code has the first value indicating the lock mode, the control logic blocks changes which set the selected mask codes from the second value to the first value indicating the masked state, and allows changes which reset selected mask codes from the first value indicating the masked state to the second value indicating the unmasked state.

8. The circuit of claim 1, including a one-time programmable memory element storing a lock code having a first value indicating a lock mode and a second value indicating an unlocked mode, and wherein when the lock code has the first value, the control logic blocks changes to the protection codes in the plurality of nonvolatile memory elements, sets the mask code or mask codes in the set including at least one volatile memory element to the second value, and thereafter blocks changes to the protection codes or mask codes.

9. The circuit of claim 1, including a set of one-time programmable memory elements, a one-time programmable memory element in the set storing a mask lock code for a particular sector in the plurality of sectors, the mask lock code having a first value indicating a lock mode and a second value indicating an unlocked mode, and wherein when the mask lock code for a particular sector has the first value indicating a lock mode the control logic blocks changes to the protection code for the particular sector in the plurality of nonvolatile memory elements, sets the mask code to the second value indicating the unmasked state, and thereafter blocks changes to the mask code for the particular sector.

10. The circuit of claim 1, including a password protected memory element storing a protection lock code having a first value indicating a lock mode and a second value indicating an unlocked mode, and wherein the control logic blocks changes to the protection codes in the plurality of nonvolatile memory elements when the protection lock code has the first value indicating a lock mode.

11. The circuit of claim 10, wherein the control logic sets the protection lock code to the first value indicating the lock mode at an initialization event, and allows resetting to the second value indicating the unlocked mode only upon receipt of a password.

12. The circuit of claim 1, including a password protected memory element storing a mask lock code having a first value indicating a lock mode and a second value indicating an unlocked mode, and wherein the control logic sets the mask code or mask codes in at least one volatile memory element to the second value indicating the unmasked state, and thereafter blocks changes to the mask code or mask codes when the mask lock code has the first value indicating the lock mode.

13. The circuit of claim 12, wherein the control logic sets the mask lock code to the first value indicating the lock mode at an initialization event, and allows resetting to the second value indicating the unlocked mode only upon receipt of a password.

14. The circuit of claim 1, including a volatile memory element storing a protection lock code having a first value indicating a lock mode and a second value indicating an unlocked mode, and wherein the control logic blocks changes to the protection codes in the plurality of nonvolatile memory elements when the protection lock code has the first value indicating the lock mode.

15. The circuit of claim 14, wherein the control logic sets the protection lock code to the second value indicating the unlocked mode at an initialization procedure, allows setting to the first value indicating the lock mode upon receipt of a command, and thereafter blocks changes to the protection lock code until after another initialization event.

16. The circuit of claim 1, including a volatile memory element storing a mask lock code having a first value indicating a lock mode and a second value indicating an unlocked mode, and wherein the control logic blocks changes to the mask code or mask codes in the set including at least one volatile memory element when the mask lock code has the first value indicating the lock mode.

17. The circuit of claim 16, wherein the control logic sets the mask lock code to the second value indicating the unlocked mode at an initialization procedure, allows setting to the first value indicating the lock mode upon receipt of a command, and thereafter blocks changes to the mask lock code until after another initialization event.

18. A method for protecting data on an integrated circuit including a memory, comprising:

storing a plurality of protection codes on the integrated circuit, each protection code having a first value indicating a protected state or a second value indicating an unprotected state for a corresponding sector in a plurality of sectors of the memory;

storing a set including at least one protection mask code on the integrated circuit, the at least one protection mask code having a first value indicating a masked state or a second value indicating an unmasked state for a corresponding sector in the plurality of sectors;

the at least one protection mask code being cleared during a power-down event; and blocking modification in a particular sector of the memory using circuitry on the integrated circuit when the protection code for the particular sector has the first value which indicates the protected state and the mask code for the particular sector has the second value which indicates the unmasked state, else allowing modification in the particular sector.

19. The method of claim 18, including storing the plurality of protection codes in a plurality of nonvolatile memory elements configured for an erase operation which sets all the protection codes stored in the plurality to the second value which indicates the unprotected state, and for a program operation which is configured to set individual selected protection codes to the first value which indicates the protected state.

20. The method of claim 18, including storing the set including at least one protection mask code in memory on the integrated circuit configured for an operation which sets an individual selected mask code from the second value which indicates the unmasked state to the first value which indicates the masked state, and for an operation which resets an individual selected mask code from the first value which indicates the masked state to the second value which indicates the unmasked state.

21. The method of claim 18, including using a single protection mask code that corresponds to all, or more than one, of the sectors in the plurality of sectors.

22. The method of claim 18, including storing in a one-time programmable memory element a protection lock code having a first value indicating a lock mode and a second value indicating an unlocked mode, and wherein changes to the protection codes are blocked when the protection lock code has the first value indicating the lock mode.

23. The method of claim 18, including storing in a one-time programmable memory element a mask lock code having a first value indicating a lock mode and a second value indicating an unlocked mode, and wherein the mask code or mask codes are set to the second value indicating the unmasked state, and thereafter changes to the mask code or mask codes are blocked when the mask lock code has the first value indicating the lock mode.

24. The method of claim 18, including storing in a one-time programmable memory element a mask lock code having a first value indicating a lock mode and a second value indicating an unlocked mode, and wherein when the mask lock code has the first value indicating the lock mode, blocking changes which set the selected mask codes from the second value indicating the unmasked state, to the first value indicating the masked state, and allowing changes which reset selected mask codes from the first value indicating the masked state to the second value indicating the unmasked state.

25. The method of claim 18, including storing in a one-time programmable memory element a lock code having a first value indicating a lock mode and a second value indicating an unlocked mode, and wherein when the lock code has the first value indicating a lock mode, blocking changes to the protection codes, setting the mask code or mask codes in the set including at least one volatile memory element to the second value indicating an unlocked mode, and thereafter blocking changes to the protection codes or mask codes.

26. The method of claim 18, including storing in each element of a set of one-time programmable memory elements a mask lock code for a particular sector in the plurality of sectors, the mask lock code having a first value indicating a lock mode and a second value indicating an unlocked mode, and wherein when the mask lock code for a particular sector has the first value indicating a lock mode blocking changes to the protection code for the particular sector, setting the mask code for the particular sector to the second value indicating the unmasked state, and thereafter blocking changes to the mask code for the particular sector.

27. The method of claim 18, including storing in a password protected memory element a protection lock code having a first value indicating a lock mode and a second value indicating an unlocked mode, and blocking changes to the protection codes when the protection lock code has the first value indicating a lock mode.

28. The method of claim 27, wherein the protection lock code is set to the first value indicating the lock mode at an initialization event, and resetting to the second value indicating the unlocked mode is allowed only upon receipt of a password.

29. The method of claim 18, including storing in a password protected memory element a mask lock code having a first value indicating a lock mode and a second value indicating an unlocked mode, and wherein the mask code or mask codes are set to the second value indicating the unmasked state, and thereafter changes to the mask code or mask codes are blocked when the mask lock code has the first value indicating the lock mode.

30. The method of claim 29, wherein the mask lock code is set to the first value indicating the lock mode at an initialization event, and resetting to the second value indicating the unlocked mode is allowed only upon receipt of a password.

31. The method of claim 18, including storing in a volatile memory element a protection lock code having a first value indicating a lock mode and a second value indicating an unlocked mode, and wherein changes to the protection codes are blocked when the protection lock code has the first value indicating the lock mode.

32. The method of claim 31, wherein the protection lock code is set to the second value indicating the unlocked mode at an initialization procedure, the protection lock code is allowed for setting to the first value indicating the lock mode upon receipt of a command, and thereafter changes to the protection lock code are blocked until after another initialization event.

33. The method of claim 18, including storing in a volatile memory element a mask lock code having a first value indicating a lock mode and a second value indicating an unlocked mode, and wherein changes to the mask code or mask codes in the set are blocked when the mask lock code has the first value indicating the lock mode.

34. The method of claim 33, wherein the mask lock code is set to the second value indicating the unlocked mode at an initialization procedure, the mask lock code is allowed for setting to the first value indicating the lock mode upon receipt of a command, and thereafter changes to the mask lock code are blocked until after another initialization event.

* * * * *